O. ANDERSON AND F. W. SALSBURY.
WINDSHIELD CLEANER FOR AUTOMOBILES.
APPLICATION FILED DEC. 11, 1920.

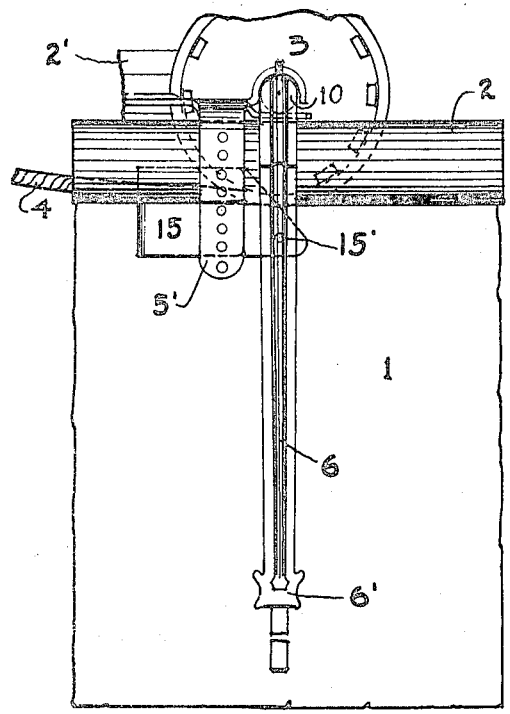
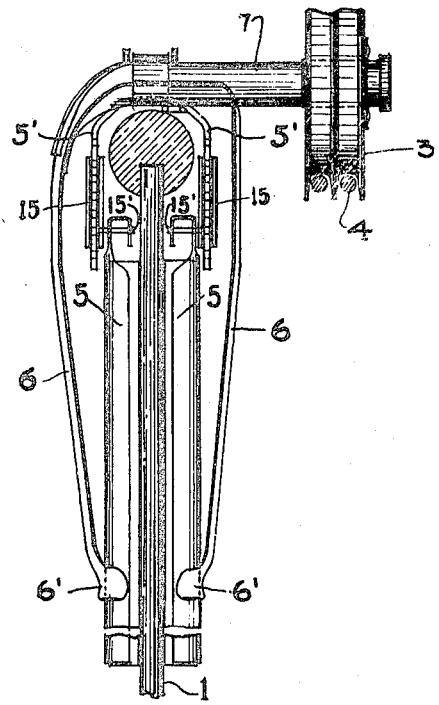
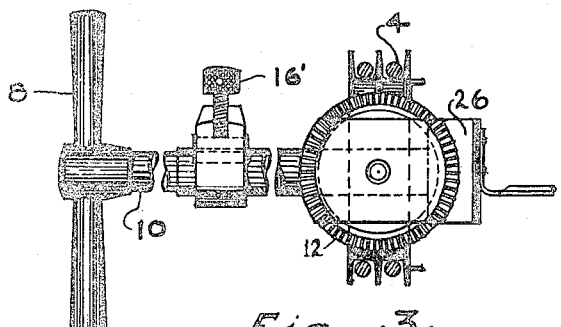

1,419,601.

Patented June 13, 1922.
3 SHEETS—SHEET 2.

WITNESSES.
Edith M. Bromley.
Henry J. Blair, Jr.

Otto Anderson
Frank W. Salsbury
INVENTORS.
BY James A. Jenks
ATTORNEY.

UNITED STATES PATENT OFFICE.

OTTO ANDERSON AND FRANK W. SALSBURY, OF PAWTUCKET, RHODE ISLAND.

WINDSHIELD CLEANER FOR AUTOMOBILES.

1,419,601.   Specification of Letters Patent.   Patented June 13, 1922.

Application filed December 11, 1920. Serial No. 430,069.

*To all whom it may concern:*

Be it known that we, OTTO ANDERSON and FRANK W. SALSBURY, citizens of the United States, residing at Pawtucket, in the county of Providence and State of Rhode Island, have invented certain new and useful Improvements in Windshield Cleaners for Automobiles, of which the following is a specification.

Our invention relates to improvements in wind-shield cleaners for automobiles, and the purpose of our invention is to provide a wind-shield cleaner that will be operated by a handle adjustable in a vertical plane, and also adjustable as to length, so that the operator of an automobile can readily reach the handle of the cleaner without bending forward, or taking his attention from the steering wheel; and by the movement of the handle through a vertical plane, the handle may be pushed upward, when not in use, so as not to be in the way of the occupants of the vehicle.

Our invention also embodies a novel rubber or portion of the cleaner which comes in contact with the wind-shield, and certain new features for attaching the same to the wind-shield cleaner.

A further purpose of our invention is to provide a wind-shield cleaner in the use of which the hand of the person operating the same will be out of the direct forward range of his vision; i. e. his hand will not cut off his view of the road ahead of him.

We accomplish these objects by the device shown in the accompanying drawings, in which—

Figure 1 is a vertical front view of a portion of the glass wind-shield of an automobile showing a portion of our device mounted on the frame of the wind-shield.

Figure 2 is a view of the same in a plane at right angles to the view presented in Figure 1, while Figure 3 shows the handle which operates the cleaner, and certain details of the pulleys by which the cleaner is revolved.

Figure 6:
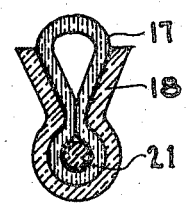

Figure 6 a modification of the same.

Figure 7:
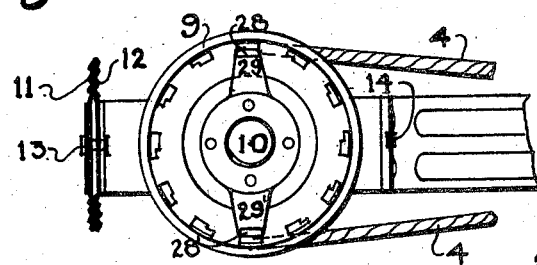
Figure 8:
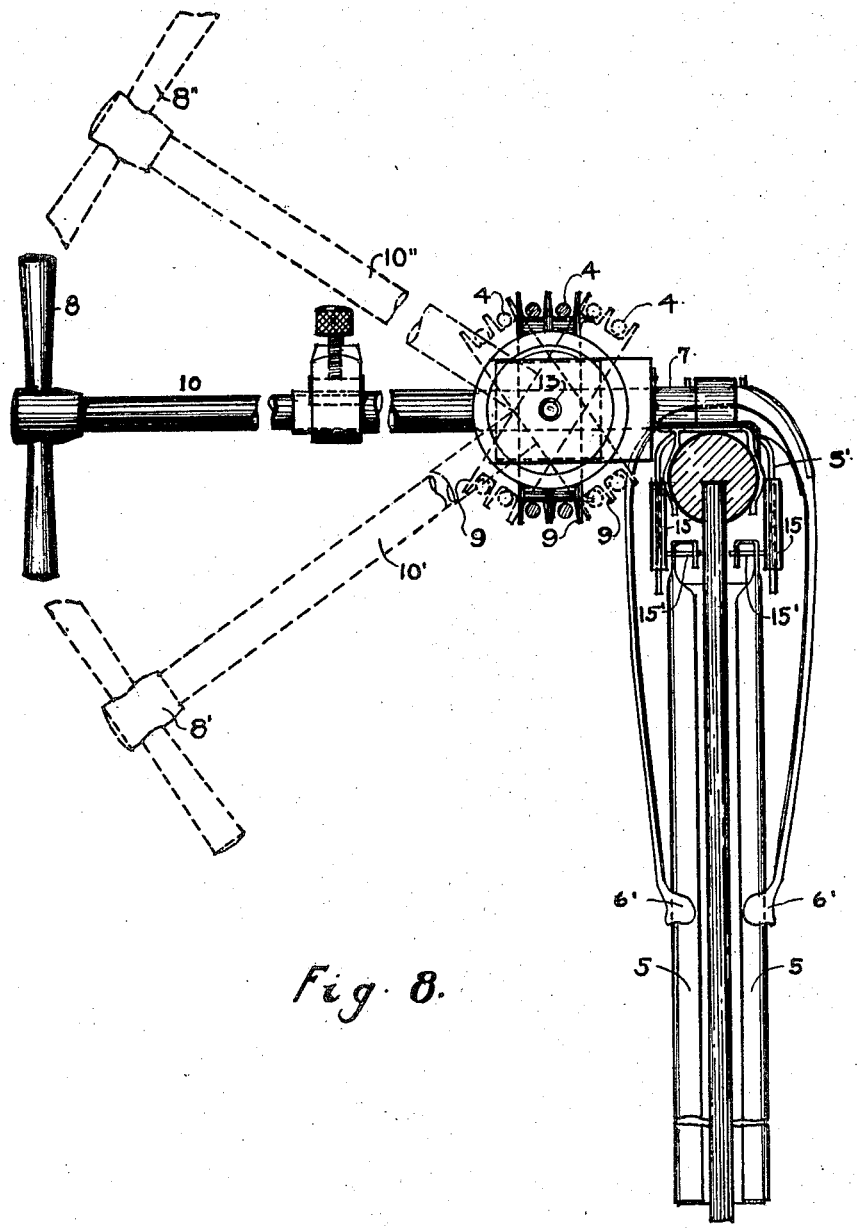

Figure 7 shows a detail of the mechanism by which the adjustable handle is operated and held in position, while Figure 8 discloses more clearly the handle and the manner in which it may be moved radially through a vertical plane.

Figure 9:
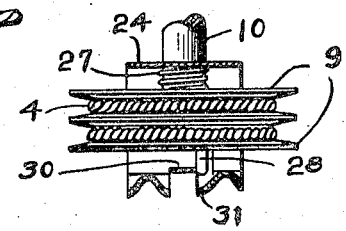

Fig. 9 is a view in detail of the structure shown in Fig. 7.

The same parts are indicated by the same numerals throughout the several views.

In Figure 1, 1 represents the upper half of an ordinary glass wind-shield, 2 being the upper frame thereof.

3 is a grooved pulley carrying the cord 4. Instead of the cord 4, a chain or other traction agent may be used.

Figure 5:
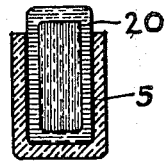
Figure 5 is a cross section of the rubber of our cleaner.

5—5, as shown in Figure 2, are the members which hold the felt, rubber, or other substance, in contact with the glass 1, and consist of longitudinal pieces of sheet metal, or other suitable material folded so as to have a substantially U shaped cross section, as disclosed in Figures 5 and 6.

6—6 are guides or arms connected with the axle 7 of the pulley 3 and revolving therewith and operating to hold the members 5—5 against the glass on both sides thereof, these members 5—5 being seen best in Figure 2.

As is shown in Figure 2, the lower portion of the arms 6—6 represented by 6'—6' make a sliding contact with the holders 5—5 and are kept in contact with said holders by their own tension, the arms 6—6 operating as springs to preserve such tension.

Figure 4:
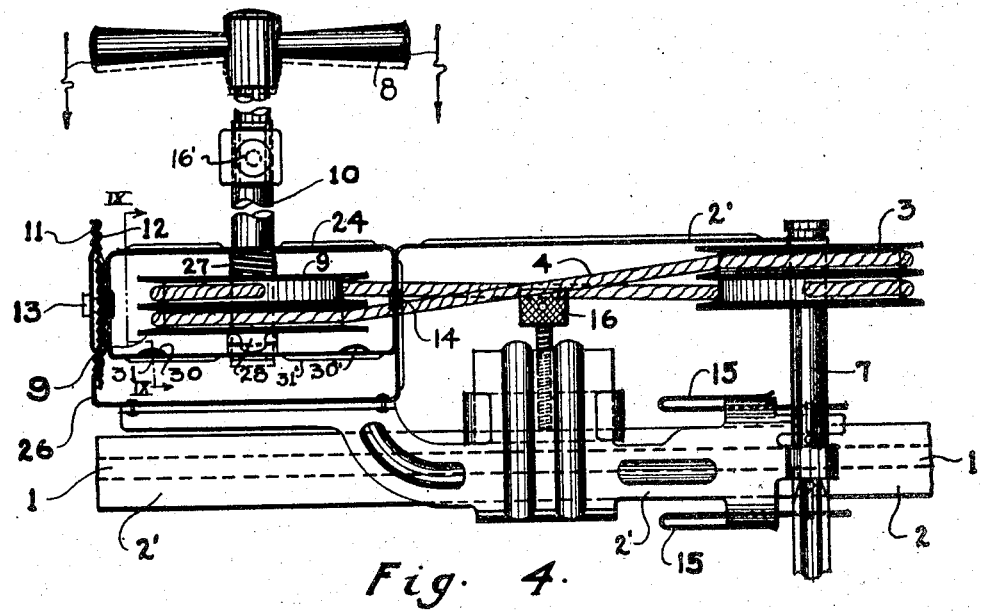
Figure 4 is a view of our device looked at from above.

The axle 7 with the pulley 3 and the members 6—6, etc., are supported upon the frame work 2' which extends longitudinally of the frame of the wind-shield, as is shown in Figure 4, and is clamped to the upper member of the frame of the wind-shield, as shown in Figure 4 by means of the screw 16. This frame work has at a point near the axle of the pulley 3 a pair of projecting wings bent downward in an inverted U shape, as shown by 5'—5' in Figures 1 and 2, and the limbs of this U shaped member 5'—5' are perforated with holes as seen best in Figure 1. Instead of these holes, depressions in the limbs of 5'—5' may be employed.

The members 5—5 which carry the felt or rubber are attached to the U shaped member 5'—5' by metal clasps 15—15 shown best in Figures 1 and 4. In Figure 1 the front half of 15 is shown removed to disclose the parts lying behind it. These clasps are each indented with two indentations arranged vertically so as to fit any required pair of perforations in the U shaped member 5'—5', thus making the rubber carrier 5 adjustable vertically, that is, it may be raised or lowered in its position by raising or lowering the clasps 15—15. This arrangement also allows the members 5—5 to be almost instantly removed for the replacement of the wiping material held thereby, or for the purpose of cleaning the same.
Each clasp 15, as shown in Figure 1, is narrowed at its open end and carries fixed to the narrow end on each side of the glass wind-shield a pivot 15' projecting inwardly toward the glass at right angles to the face of the clasp, and the rubber holders 5—5 terminate at their upper end in a hooked portion perforated so that they slip readily upon the pivots 15'—15' and revolve thereon when operated by the arms 6—6.
The frame work 2' also carries the grooved pulley 9 upon a suitable shaft or axle 10, said shaft or axle being mounted in a rectangular metal frame 24. This rectangular frame is itself pivoted upon the pivots 13 and 14 carried by the supporting frame 26 and can be made to revolve thereon by raising or lowering the axle 10 by means of the handle 8. The axle 10 with its handle 8 projects inwardly toward the driver of the automobile and is telescopic so that it may be easily shortened or lengthened according to the make of the car and the distance between the wind shield and the seat.

16', Figure 3, is a clamp for locking the telescoping members together in any desired position. When not in use, the handle 8 may be pushed upward until it is practically in contact with the top of the car, and when in use in rainy weather, the handle 8 may be pulled down so that it projects inwardly toward the driver, so as to be easily reached by him without changing his position on the seat. This angular motion is seen by reference to Figure 8 and is shown by the dotted lines, 8'—10'; 8''—10''.

The grooved pulley 3 and its axle 7 are operated by the revolution of the grooved pulley 9 through the handle 8 by means of the cord or other traction means, 4, and as the pulley 3, with its shaft, revolves, it causes to revolve also the arms 6—6 with the holders 5—5, thus cleaning the surface of the glass on both sides.

The angular position of the shaft 10 and handle 8 with reference to the wind-shield is regulated by the radially corrugated disk 12, shown in Figures 3, 4 and 7 and by that portion of the supporting frame 26 lying adjacent to 12, said portion having like corrugations 11 with the disk 12. The disk 12 is fixed upon the rectangular frame 24 and revolves with it. By means of these radial corrugations, the handle 8 and the shaft 10 may be placed at any desired angle and will not itself change therefrom but may be readily changed by slight vertical pressure upon the handle, the corrugated disk 12 being sprung slightly against the corrugated portion 11 of the supporting frame 26 by the pivot 13 riveted to the frame 26.

In Figure 6, we disclose an improved wiper holder for use on our device. It consists of a sheet metal clasp of modified cylindrical form and of the same length as the rubber which is in contact with the wind-shield and having the cross-section shown at 18 in Figure 6, such cross-section being nearly a complete circle with flanges flaring outwardly at the open edge. A piece of ordinary rubber tubing 17 of suitable size is bent and inserted into this cylindrical holder, and then a wire, 21, is run through the circular portion which expands the tubing sufficiently to fill the cylindrical space and hold the rubber tubing securely in place. By this arrangement, an old or worn tubing may be quickly removed and cleaned or a new one inserted.

Figure 5 shows a cross-section of an ordinary U shaped holder and may be used in connection with a rubber tubing; or a piece of felt or other material, 20, may be used as desired for cleaning the glass.

It is, of course, desirable in the operation of our cleaner that the holders 5—5 should, when the cleaner is not in use, be retained at the upper portion of the wind-shield, so as not to interfere with the vision of the driver; such retention of the members 5—5 is shown in Figures 4 and 7; Figure 7 being a vertical plan of the same, while Figure 4 shows the construction as looked at from above. Attached to the grooved pulley 9 is the metallic member 29—29' seen in Figure 7, having at its extremity farthest from the axle 10, the members 28—28' bent at right angles to the face of the pulley. Upon the interior of the rectangular frame 24, which, as has been said, is movable by means of the handle and shaft 8—10, are the stops 30—30', Figure 4. Between the outer or handle side of the rectangular frame 24 and the pulley 9 is the coiled spring 27 surrounding the shaft or axle 10. This axle is capable of slight longitudinal movement as indicated by the arrows at the ends of the handle 8, Figure 4, and is normally retained in the position shown in Figure 4 by means of the spring 27, with the projections 28—28' in contact with the interior of the frame 24 adjacent to said projections.

Just above and just below the stops 30—30' are depressions made in the frame 24, the two depressions nearest the observer in Figure 4 being indicated by the numerals

31—31'. As the handle 8 is revolved, the projections 28—28' when they reach these depressions are forced into the same by the spring 27 through the longitudinal movement of the shaft 10, above indicated, and further revolution is prevented by the stops 30—30', the relative arrangement of parts being such that the projections 28—28' enter the depressions aforesaid when the portion of the wind-shield cleaner carrying the rubber is at the extreme upward limit of its movement.

By the use of our invention, the wiping portion may be fixed at the upper part of the wind-shield out of the range of vision of the driver; the handle may be pushed inward by its telescopic arrangement and upward in a vertical arc so as to be out of the way of the operator when not in use, and may be pulled toward the operator and downward in a vertical arc so as to be in easy reach of his hand when needed; the wiping felt, rubber, or other material may be quickly and easily removed for replacement or cleaning and the wiping device may be adjusted so as to cover a greater or smaller area of the glass.

By the horizontal separation of the driving pulley 9 and the driven pulley 3, the hand of the operator and the handle are not in range of the driver's vision but removed to one side so that nothing interferes with his view of the road when the device is in use.

Having now described our invention, what we claim and desire to secure by Letters Pattent is:—

1. A wind-shield cleaner for automobiles comprising a supporting frame adapted to be clamped to the upper frame of the wind-shield; a wing projecting downward therefrom; a clasp adjustable vertically on said wing; and a wiper holder suspended from said clasp by a suitable support and revoluble thereon, substantially as described.

2. A wind-shield cleaner for automobiles comprising a supporting frame attachable to the wind-shield; a wing projecting downward from said frame, and having a series of perforations therein; a removable clasp engaging said wing and adjustable thereon vertically by means of indentations engaging said perforations; a pin fixed on said clasp; a wiper holder supported by said pin and revoluble thereon; a revoluble axle carried by said supporting frame; an arm fixed on said axle and engaging said wiper holder and means for imparting motion to said axle, substantially as set forth.

3. In a wind-shield cleaner for automobiles, a wiper holder comprising a hollow longitudinal cylindrical member having a cross-section of nearly a complete circle, open at one portion thereof; with flaring edges adjacent to said opening and capable of receiving a piece of tubing of rubber or other suitable material; and a round wire of such size as to fill said tubing and expand the same so as to lock it firmly within the cylindrical portion of said holder, substantially as set forth for the purpose specified.

4. In a wind-shield cleaner for automobiles, a supporting frame; an axle revolubly mounted on said frame and having a grooved pulley fixed thereon; a wiper actuated by said axle; a pivoted hollow rectangular member borne by said supporting frame, said rectangular member being revoluble upon said supporting frame in a plane at right angles to the plane of revolution of said grooved pulley; a second axle member normally parallel with said first axle and also having a grooved pulley fixed thereon and terminating outside the frame in a handle; a flexible band connecting said grooved pulleys and transmitting motion from one to the other and means for fixing said revoluble hollow rectangular member in any desired position, substantially as described.

5. A wind-shield cleaner for automobiles, comprising a supporting frame work; a clamp for affixing the same to the frame of the wind-shield, an axle having a grooved pulley fixed thereon; a second axle, a wiper actuated by said axle member normally parallel to said first axle and also provided with a grooved pulley fixed thereon, said second axle being borne by a hollow rectangular member revolubly mounted on said supporting frame; a handle formed by an extension of said second axle and serving to turn the same; a radially corrugated disk fixed to the outer face of one end of said rectangular member, the portion of the supporting frame adjacent to said disk being similarly corrugated, the said disk and the corrugated portion of the supporting frame being so sprung against each other by the elasticity of the parts as to normally engage each other, and thus retain said second axle in position; said rectangular frame with its wheel and axle being capable of being revolved by upward or downward pressure on the handle aforesaid, substantially as set forth.

6. A windshield cleaner for automobiles comprising a supporting framework, a clamp for affixing the same to the frame of the windshield, a hollow rectangular frame borne by the supporting frame of the windshield cleaner, a grooved wheel and axle revolubly mounted in said rectangular frame, said axle being movable in the direction of its length, projections on said wheel and normally in contact with the inner face of said rectangular frame, inwardly extending lug members in said frame having depressions above and below said members for receiving the projections on said wheel whereby the said projections will engage with the lug members in said frame for limiting the revolution of said wheel, a spiral spring operating to move said axle longitudinally and to force said projections into the depressions aforesaid for locking the wheel and axle and a wiper actuated by said wheel and axle.

In testimony whereof we affix our signatures in presence of two witnesses.

OTTO ANDERSON.
FRANK W. SALSBURY.

Witnesses:
EDITH M. BROMLEY,
HENRY J. BLAIS, Jr.